May 16, 1961    J. R. LUDWIG    2,984,091
SLEEVE SPRING DAMPER

Filed Oct. 23, 1959    2 Sheets-Sheet 1

INVENTOR.
JOHN ROBERT LUDWIG
BY Walter E. Pavlick
ATTORNEY

May 16, 1961     J. R. LUDWIG     2,984,091
SLEEVE SPRING DAMPER

Filed Oct. 23, 1959     2 Sheets-Sheet 2

INVENTOR.
JOHN ROBERT LUDWIG

BY *Walter E. Pavlick*

ATTORNEY

United States Patent Office 2,984,091
Patented May 16, 1961

2,984,091

SLEEVE SPRING DAMPER

John Robert Ludwig, Swanton, Ohio, assignor to Dana Corporation, Toledo, Ohio, a corporation of Virginia Filed Oct. 23, 1959, Ser. No. 848,360

13 Claims. (Cl. 64—27)

This invention relates to rotary motion transmitting elements in general, and is particularly directed to improvements in automotive type friction clutch plates. The present improvements are substantially equally applicable to vibration dampers since the improvements are concerned with varying the rate of shock absorption and vibration dampening.

The primary object of this invention is to provide a rotary motion transmitting element, such as a clutch plate, having drive spring means slidably mounted between the relatively oscillatory inner and outer elements to form a lost motion connection therebetween and incorporating a friction brake or drag means between the opposite ends of each drive spring to check the compression and recoil action of the drive springs to smoothen the drive.

In prior constructions friction brake means were provided as shown, for example, in Thelander Patent No. 2,674,863, but such constructions have not been completely satisfactory in all applications for the following reasons:

(1) Angular movement cannot occur between the relatively oscillatory inner and outer elements without first compressing the drive spring means. This, in effect, stiffens the dampening rate as the force required to compress the spring is increased by the amount of force required to overcome the friction brake means.

(2) The physical relationship between the drive spring means and the braking means is such that the braking means provides a constant hysteresis throughout all operating conditions of the device.

It has been discovered that by a relatively slight but heretofore unconceived mechanical arrangement of conventional clutch parts that the above mentioned deficiencies can be overcome. This is accomplished by elongating the notches in the inner rotary member and increasing the length of the C-section sleeve springs positioned therein so that each drive spring and its respective positioning buttons are slidable as a unit on the sleeve spring between the end walls of the notch. This arrangement permits a predetermined amount of relative oscillatory motion between the inner and outer members to overcome the friction braking of the C-section sleeve spring without compressing the drive springs. During this predetermined motion the C-section sleeve spring offers frictional resistance to movement of both spring positioning buttons. After this predetermined lost motion movement, one of the spring positioning buttons abuts against an end wall of the notch and remains fixed so that the friction brake is only applied to retard movement of the other spring positioning button during compression of the drive spring. Thus, the friction braking force becomes one half of its prior value.

In the preferred embodiment of this invention, the motion transmitting device comprises a pair of relatively movable members. A resilient lost motion means or drive spring is disposed between the members for transmitting movement from one member to the other. Another lost motion means is provided between the resilient lost motion means and the movable members so that relative movement of the members is permitted prior to actuation of the resilient lost motion means.

Further objects and advantages will become apparent from the following detailed description taken in connection with the accompanying drawings wherein.

Figure 1:
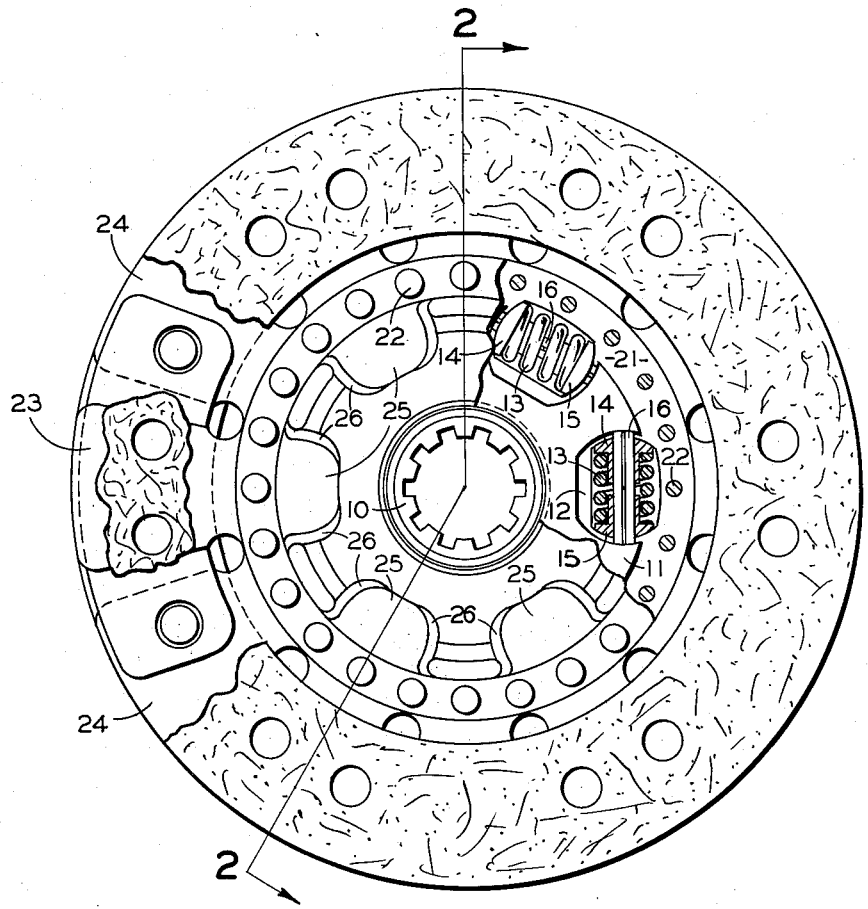
Fig. 1 is a rear view of the clutch plate made in accordance with this invention showing a portion of the hub cover broken away to better illustrate the hub construction.
Figure 2:
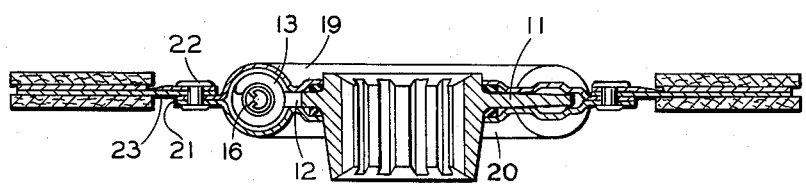
Fig. 2 is a sectional view taken substantially along line 2—2 of Fig. 1.

Referring more particularly to Figs. 1 and 2, the clutch plate shown comprises rotatable inner and outer portions, the inner portion being formed by a center hub 10, splined for driving connection with a driving shaft of an automotive transmission and provided with an annular flange 11, in which there are circumferentially spaced recesses or notches 12, one for each of a plurality drive spring cushioning means 13. Assembled in each notch 12 with the spring are two buttons or pistons 14 and 15 and a split cylindrical or C-section sleeve spring 16, which is compressed radially so as to permit insertion of its opposite end portions in the elongated hub portions 17 which extend from the flanges of the buttons 14 and 15. The tendency of the spring 16 to expand to its normal diameter is utilized to provide a friction braking effect in the hub portion 17 to resist compression and recoil action of the drive cushioning spring 13 associated therewith, and also compensate automatically for what little wear will occur. Thus, there is no need for manual adjustments, and the springs 16 can be assembled inside the clutch plate where they are not accessible. While the provision of a brake spring 16 has been shown associated with each of the drive cushioning springs 13 in Fig. 1, it will be understood that in some cases some of the brake springs 16 may be omitted as, for example, from alternate cushioning springs 13, if that much less braking effect is desired for a given engine. In other words, the application of this improvement is quite flexible and easily adaptable to different requirements.

The buttons 14 and 15 can be of any type of construction, for example, a stamped sheet metal construction for economy of manufacture as well as lightness, strength and durability. The inner surface 18 of the buttons 14 and 15 are in immediate contact with the opposite ends of the spring cushioning means 13. The hub portions 17 have easy working fit in the opposite end portions of the spring 13.

Figure 4:
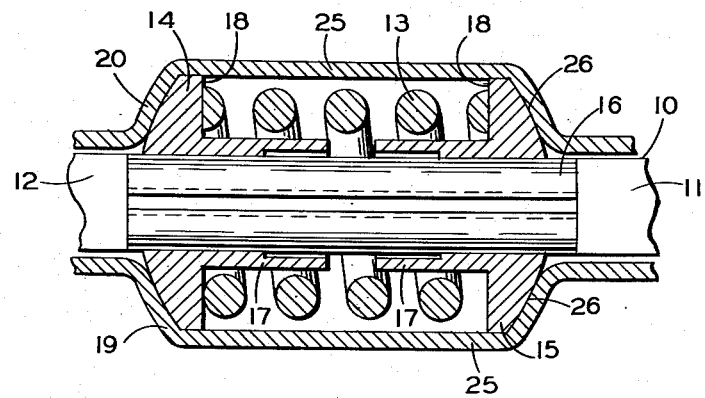
Fig. 4 is a sectional detail taken substantially along line 4—4 of Fig. 3.

A pair of circular sheet metal cover plates 19 and 20 are disposed on opposite sides of the flange 11 and have annular peripheral flanges 21 disposed in abutment in the plane of the flange 11 and riveted together, as at 22. The rivets 22 also serve to fasten two series of like stamped sheet metal segments 23 and 24 in two planes to the flanges 21 to complete the assembly of the outer element of the clutch plate. The sheet metal segments 23 and 24 are provided with appropriate friction facings and also carry flat leaf springs interleaved therebetween to provide the desired "mush" effect upon engagement of the clutch. The plates 19 and 20 are formed to provide circumferentially spaced embossed pocket portions 25 registering with the notches 12 in the flange 11 and housing the cushion or drive springs 13 and their cooperating buttons 14 and 15 and brake springs 16. These embossed portions 25 present end walls 26 for abutment with diametrically opposed portions of each of the buttons 14 and 15 on opposite sides of the flange 11 as clearly appears in Fig. 4.

Figure 3:
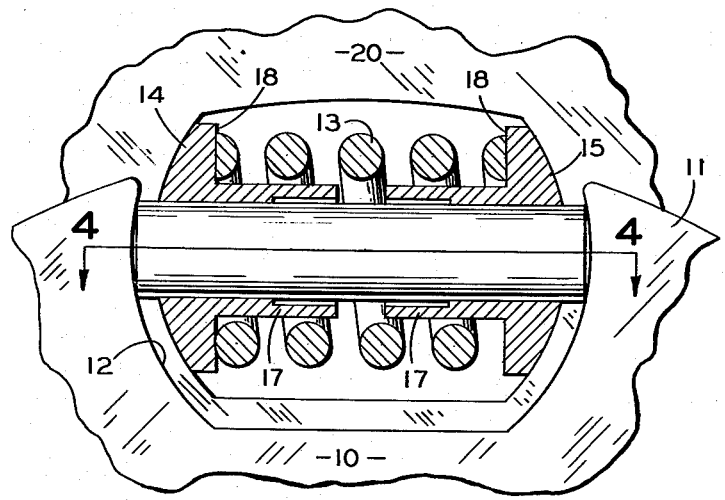
Fig. 3 is an enlarged sectional detail in the plane of Fig. 1 in which the two buttons are shown in their preferred relationship to the split sleeve spring.

Attention is now directed in Fig. 3 to the fact that the length of the notch 12 and also the length of the C-spring 16 mounted therein is greater than the total length of the coil spring 13 and the thickness of the flanges of spring positioning buttons 14 and 15. Thus, slidable movement by coil spring 16 and buttons 14 and 15 on the sleeve spring 16 is permitted prior to compression of the coil spring.

In operation, upon movement of cover plates 19 and 20 in a counterclockwise direction relative to flange 11, shoulders 26 of the embossed portions 25 exert a driving force on buttons 15. This driving force causes movement of the resilient means 13, and the buttons 14 and 15 to the left as viewed in Fig. 3 until the button 14 contacts the flange 11 of the hub 10. The stiffness of the spring 13 is such that it will not be compressed but will move with buttons 14 and 15 as a unit. During this movement, the brake springs 16 by reason of its expansive action will offer frictional resistance to movement of both buttons 14 and 15 to establish a hysteresis of a given value.

Upon further relative movement shoulders 26 will continue to exert a driving force on the buttons 15. Since the button 14 is now in engagement with the end wall of notch 12, only button 15 will be moved to the left and the coil spring 13 will be compressed. It should be pointed out that since the button 14 is fixed, brake spring 16 will offer frictional resistance only to movement of button 15 and the hysteresis will be reduced to one-half or other fraction of its initial value depending on the relative frictional resistance of the buttons. The springs 13 are compressed to the extent required to overcome the resistance to turning of the hub 10 and the parts to which it is connected. After the resistance to turning has been overcome and the springs 13 tend to recoil, return of the parts to their initial position is again frictionally resisted by the brake spring 16, the operation at this point being substantially the reverse of what has just been described.

During coasting when the drive is from the rear axle to the engine, the reverse of the operation just described occurs, the thrust being from left to right in Fig. 3, the buttons 14 and 15 being moved to the right relative to the brake spring 16 until the button 15 contacts the flange 11 of the hub 10. Continued thrust to the right moves the button 14 against the resistance of brake spring 16 to compress the coil spring 13. Upon subsequent recoil action of the cushioning spring 13, the brake spring 16 also resists return of the buttons 14 and 15 to their starting position.

The hub portions 17 of the buttons 14 and 15 are of sufficient elongation to retain the ends of brake springs 16 within the hubs and provide ample bearing surfaces therefor so that wear is reduced to a minimum. Buttons 14 and 15, aside from cooperating with the brake spring 16 to retain the same, serve to hold the coil springs 13 in spaced relation relative to adjacent parts to prevent snagging of the spring or excessive wear on the ends thereof.

From the foregoing description it is apparent that the resiliency of coil spring 13 provides a lost motion means between the inner and outer rotary members to cushion the drive therebetween. Furthermore, this resilient lost motion means is slidable on the brake springs 16 between the end walls of notches 12 to provide another lost motion means. During the slidable movement of the resilient lost motion means, the brake spring 16 provides a friction drag on both buttons 14 and 15 to establish a hysteresis of a given value. When one of the buttons engages an end wall of the notch 12, the coil spring 13 is compressed. During this compression the friction brake 16 provides a drag on only one button to reduce the hysteresis. Thus, only the force of the frictional brake means need be overcome initially and upon compressing of the coil spring 13, the resistance force of the frictional brake means is reduced.

While only a single embodiment of this invention has been shown and described, it will be obvious that various changes in details which have been herein described and illustrated in order to explain the nature of this invention, may be made by those skilled in the art within the principle and scope of the invention as expressed in the appended claims.

What is claimed is:

1. In a rotary motion transmitting device the combination comprising relatively oscillatable inner and outer members, a movable resilient means adapted to be compressible between said inner and outer rotary members to resist relative rotary movement therebetween, friction brake means associated with said resilient means to resist movement thereof, and means forming a lost motion connection between said resilient means and said inner and outer members whereby said friction brake means resists movement of said resilient means prior to actuation of said resilient means.

2. In a rotary motion transmitting device the combination comprising a hub member having a flange, a plate member overlying opposite sides of the flange and oscillatable relative thereto, the plate and flange having a series of registering recesses, resilient means in said recesses adapted to be compressible between said hub and said plate to resist relative rotary movement therebetween, the length of said recesses in one of said members being greater than the free length of said resilient means for permitting slidable movement thereof to form a lost motion connection between said members, and friction brake means in said recesses supplying an initial force resisting relative movement of said members, said friction braking force being decreased upon compression of said resilient means.

3. In a rotary motion transmitting element the combination comprising a hub member having a flange, a plate member overlying opposite sides of the flange and oscillatable relative thereto, the plate and flange having a series of registering recesses, resilient means in said recesses adapted to be compressible between said hub and said plate to resist relative rotary movement therebetween, the length of said recesses in one of said members being greater than the free length of said resilient means thereby permitting free bodily movement of said resilient means in said recesses to form a lost motion connection between said members, and friction brake means disposed in said recesses for resisting movement of said resilient means.

4. In a motion transmitting device the combination comprising a pair of relatively movable members having registering recesses, an elongated member mounted in the recess of one of said members, resilient means movably disposed on said elongated member and adapted to be compressed between said relatively movable members to resist movement therebetween, the length of the recesses in said one member being greater than the free length of said resilient means whereby said resilient means is bodily movable on said elongated member prior to compression between said relatively movable members, and said elongated member having a spring pressure acting substantially radially thereof to retard movement of said resilient means.

5. In a rotary motion transmitting device the combination comprising relatively oscillatable inner and outer members, the inner member comprising a center hub, the outer member comprising a housing enclosing said hub and adapted to have limited rotary movement relative thereto, said hub and said housing having registering recesses, an elongated member mounted in the recess of one of said members, and resilient means disposed on said elongated member and adapted to be compressible between said hub and said housing to resist relative rotary movement therebetween, said resilient means being movable in the recess of said one member prior to compression thereof between said hub and said housing, thereby forming a lost motion connection, and said elongated member having a spring pressure acting sustantially radially thereof to retard movement of said resilient means.

6. In a motion transmitting device the combination comprising a pair of relatively movable members having registering recesses, resilient means disposed in said recesses and adapted to be compressible between said relatively movable members to resist movement therebetween, buttons abutting opposite ends of said resilient means and being adapted to engage said relatively movable members to transmit pressure to said resilient means, the length of said recesses in one of said members being greater than the total of the free length of said resilient means and the thickness of said buttons thereby forming a lost motion connection between said relatively movable members, said buttons having centering holes provided therein, and radially expansible means extending through said holes and interconnecting said buttons to resist movement thereof, said radially expansible means resisting movement of both of said buttons during the lost motion movement of said resilient means and resisting movement of only one button during compression of said resilient means thereby providing a variable hysteresis.

7. In a rotary motion transmitting device the combination comprising a hub having a flange member, a plate member overlying opposite sides of the flange and oscillatable relative thereto, the plate member and flange member having a series of registering recesses, coil springs in said recesses adapted to be compressible between said flange member and said plate member to resist relative rotary movement therebetween, buttons abutting opposite ends of each coil spring and adapted to engage said plate member and said flange member to transmit pressure to said spring, the length of said recesses in one of said members being greater than the total of the free length of said coil spring and the thickness of said buttons thereby forming a lost motion connection between said members, said buttons having centering holes provided therein, and radially expansible means extending through said holes and interconnecting said buttons to resist movement thereof, said radially expansible means resisting movement of both of said buttons during the lost motion movement of said coil spring and resisting movement of only one button during compression of said coil spring.

8. A clutch plate comprising a hub having a flange member, a plate member overlying opposite sides of the flange and oscillatable relative thereto, the plate member and flange member having a series of registering recesses, coil springs movably positioned in said recesses and arranged to yieldingly resist relative rotary movement between said flange and said plate members, buttons abutting opposite ends of each of said coil springs and transmitting pressure to said springs upon relative rotary movement between the flange and plate members, and radially expansible means mounted in the recesses of one of said members and interconnecting said buttons so as to frictionally resist movement thereof, the length of each of the recesses in said one member being greater than the total of the free length of a coil spring and the thickness of the abutting buttons to form a lost motion connection between said plate and said flange members, said radially expansible means resisting movement of both of said buttons during the lost motion movement of said coil spring and resisting movement of only one button during compression of said coil spring thereby providing a variable hysteresis.

9. In a motion transmitting device the combination comprising a pair of relatively movable members, resilient means adapted to transmit movement from one member to the other, and friction braking means supplying an initial force resisting relative movement of said members, said movement resisting force supplied by said friction braking means being decreased upon compression of said resilient means.

10. In a rotary motion transmitting device the combination comprising a pair of relatively oscillatable members, resilient means bodily movable relative to said members and adapted to be compressible therebetween for resisting relative rotary movement thereof, and friction braking means resisting movement of said resilient means.

11. In a rotary motion transmitting device the combination comprising a pair of relatively oscillatable members, resilient means compressible between said members for resisting relative rotary movement, means forming a lost motion connection between said resilient means and said oscillatable members to permit limited movement of said resilient means, and friction braking means resisting movement of said resilient means.

12. In a rotary motion transmitting device the combination comprising a pair of relatively movable members, resilient means compressible between said movable members for resisting relative rotary movement, means forming a lost motion connection between said resilient means and said movable members to permit limited movement of said resilient means, and friction breaking means supplying an initial force resisting relative movement of said members, said force being decreased upon compression of said resilient means.

13. In a rotary motion transmitting device the combination comprising a pair of relatively movable members, resilient means compressible between said movable members for resisting relative rotary movement therebetween, means forming a lost motion connection between said resilient means and said movable members for permitting limited movement of said resilient means, and friction braking means cooperable with said resilient means for supplying an initial force for resisting movement of the same, said force being decreased upon compression of said resilient means.

References Cited in the file of this patent

UNITED STATES PATENTS

| | | |
|---|---|---|
| 2,244,134 | Thelander | June 3, 1941 |
| 2,321,941 | Rose | June 15, 1943 |
| 2,674,863 | Thelander | Apr. 13, 1954 |